No. 870,828.
PATENTED NOV. 12, 1907.
S. JORGENSEN.
DIE STOCK.
APPLICATION FILED AUG. 13, 1906.
2 SHEETS—SHEET 1.
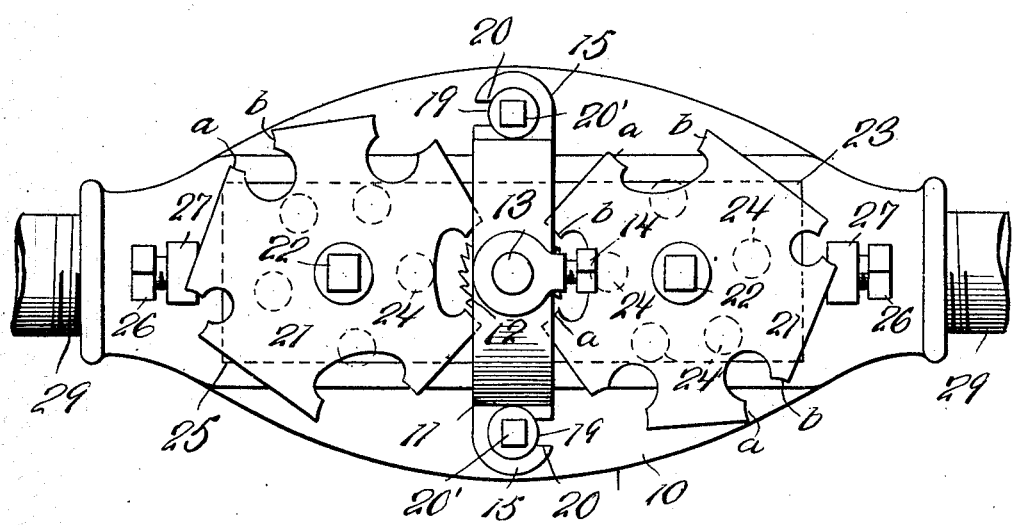
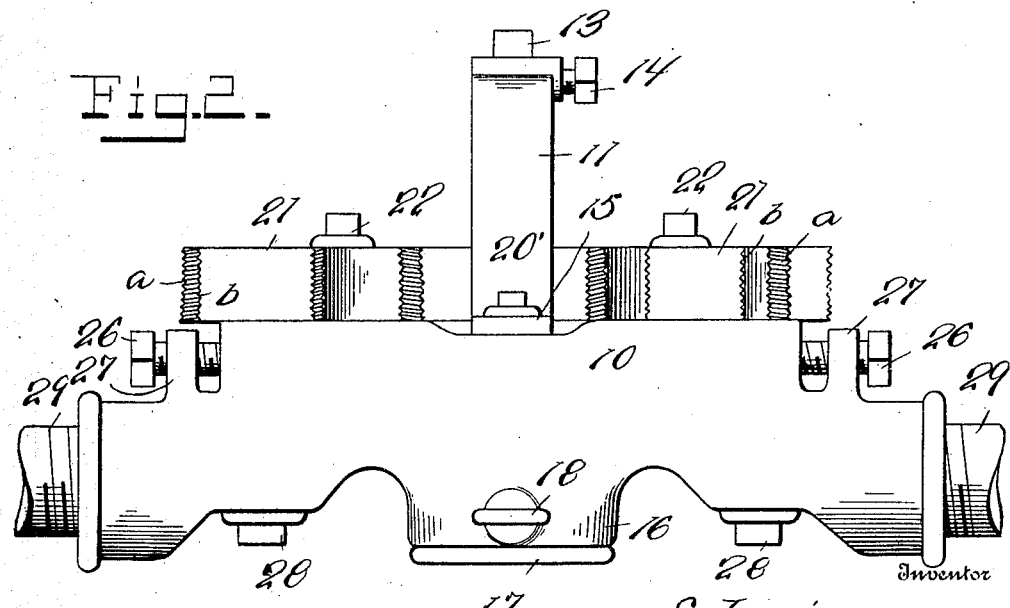
Witnesses
G. R. Thomas
F. B. MacNab
Inventor
S. Jorgensen
By Kraudell Kraudell
Attorneys

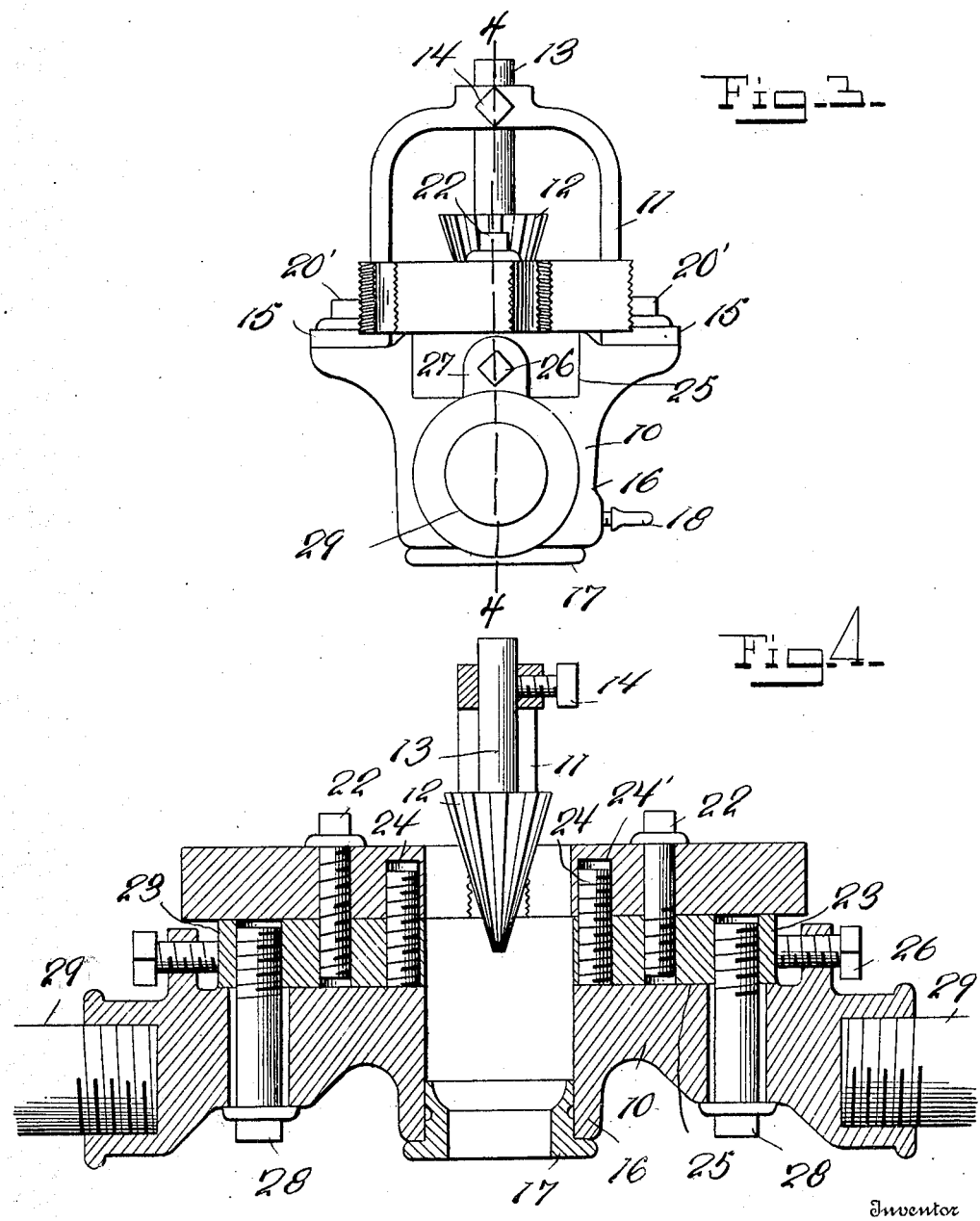

UNITED STATES PATENT OFFICE.

SEVERIN JORGENSEN, OF ARCATA, CALIFORNIA.

DIE-STOCK.

No. 870,828.   Specification of Letters Patent.   Patented Nov. 12, 1907.

Application filed August 13, 1906. Serial No. 330,379.

*To all whom it may concern:*

Be it known that I, SEVERIN JORGENSEN, a citizen of the United States, residing at Arcata, in the county of Humboldt, State of California, have invented certain new and useful Improvements in Die-Stocks; and I do hereby declare the following to be a full, clear, and exact description of the invention, such as will enable others skilled in the art to which it appertains to make and use the same.

This invention has relation to pipe reaming and threading implements.

It is the object of the invention to provide an implement of the kind mentioned that shall embody in its construction rotary adjustable dies having cutting faces located at varying distances from their axes for threading pipes of different sizes or diameters.

It is a further object of the invention to provide improvements in a reaming and threading implement that shall have its efficiency adjustability and general utility enhanced, to the ends of improving its effects, rendering it more convenient of operation and adjustment, and saving time and labor through its employment.

The invention is clearly and fully portrayed in the annexed drawings forming a part of this specification, in view of which the invention will first be described in detail and then be pointed out in the subjoined claims.

Of the said drawings:—Figure 1 is a plan of the implement. Fig. 2 is a side elevation. Fig. 3 is an end view. Fig. 4 is a longitudinal section in the plane 4—4 of Fig. 3.

Similar numerals of reference designate the same parts or features, as the case may be wherever they occur.

In the drawings 10 designates the stock or frame which is provided with the usual central opening, and is provided on its upper side with a yoke 11, for supporting the reamer, 12, through the medium of its stem, 13, adjustable vertically in the yoke and held in adjusted position by means of the set-screw 14. The yoke is provided at its lower end with laterally extended feet 15 that are bolted to the stock. The stock is provided at the central part of its bottom with a tubular depending part 16, in which is removably secured a follower, 17 by a set-screw, 18, which follower is suited to the size of pipe under treatment.

The holes 19 formed in the feet 15 of the yoke 11 which constitute the reamer support, as stated, have openings 20 opening out laterally therefrom, so that by simply loosening the bolts 20, the yoke and reamer with their connections may be removed. The fact that the stem 13 which supports the reamer is adjustable vertically in the yoke, enables the operator to cut the thread on the pipe and ream out the bur at the same time, as will presently appear more clearly. 21 designates the dies—one on each side of the pipe being operated upon—each die having five cutting faces, *a*, *b*, on its periphery, each pair of cutting-faces being located at a different distance from its axis from each and every other pair of cutting-faces, so that by a rotary adjustment of the dies on the screw-bolts, 22, that secures them to the adjustable beds 23, either of the five cutting faces can be brought into use, so that five different sizes of pipe can be cut or threaded with the same dies. The dies are kept from turning on their bolts 22, by means of set screws 24, turned up through the beds 23, and at their ends entering sockets 24, formed in the bottom of the dies, which sockets are made in front of each pair of cutting faces of the said dies.

The beds 23 are arranged between guides, 25 of the stock, and set screws 26 tapped through upwardly extended lugs 27 at the ends of the stock, and bearing at their inner ends against the outer ends of the beds, comprise means whereby the beds may be adjusted inward, to adjust the dies to the desired cut. The set-screws 28 extending up through slots in the stock and tapped into the beds operate to hold the beds in their adjusted position. The rods or pipes, 29 screwed into the ends of the stock 10 afford means for operating the utensil by rotating the stock and its appliances about the pipe.

By the hereinbefore described means and their mode of operation, it will be seen that the implement is enabled to perform all of the functions mentioned at the outset of this specification, and in doing this to support the advantages and conveniences ascribed to it. It is to be noted that the dies themselves are adjustable as well as being adjustable on their supports or beds.

It is recognized that changes may be made in the form and arrangement of parts comprising the invention without departing from the nature or spirit thereof.

What is claimed as the invention, is:—

A device of the type set forth comprising a stock formed with a central opening and with spaced parallel longitudinal upstanding guides on each side of said opening, beds mounted for sliding adjustment on each side of said opening, adjusting screws mounted at the ends of said beds, and adapted to engage the same to adjust them inwardly with relation to said opening, said beds having openings extending vertically therethrough, screws projected through said stock and engaged in said last named openings to hold said beds at selected positions to which they may be adjusted, cutting dies pivotally mounted on said beds and having a plurality of cutting faces, said dies being mounted for pivotal adjustment so as to present selected faces over said openings, said dies having sockets extending from the underneath surfaces thereof and screw posts threaded into said beds and designed for engagement in selected ones of said sockets to hold said dies at selected positions to which they may be adjusted.

In testimony whereof, I affix my signature, in presence of two witnesses.

SEVERIN JORGENSEN.

Witnesses:
W. H. STONE,
F. H. TOOBY.